United States Patent
Masaki et al.

(10) Patent No.: US 8,796,902 B2
(45) Date of Patent: Aug. 5, 2014

(54) ELECTROSTATIC INDUCTION POWER GENERATOR

(75) Inventors: Tatsuakira Masaki, Kyoto (JP); Kenji Sakurai, Kizugawa (JP); Toru Yokoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 383 days.

(21) Appl. No.: 13/386,907

(22) PCT Filed: Jul. 29, 2010

(86) PCT No.: PCT/JP2010/062829
§ 371 (c)(1),
(2), (4) Date: Apr. 4, 2012

(87) PCT Pub. No.: WO2011/021488
PCT Pub. Date: Feb. 24, 2011

(65) Prior Publication Data
US 2012/0181897 A1     Jul. 19, 2012

(30) Foreign Application Priority Data
Aug. 21, 2009  (JP) .................. 2009-191993

(51) Int. Cl.
*H02N 1/00*     (2006.01)
(52) U.S. Cl.
USPC ......................................................... 310/309
(58) Field of Classification Search
CPC .............................. H02N 1/008; H02N 1/006
USPC .......................................................... 310/309
See application file for complete search history.

(56) References Cited

U.S. PATENT DOCUMENTS

| | | | |
|---|---|---|---|
| 7,999,434 B2* | 8/2011 | Murayama et al. | 310/309 |
| 8,018,119 B2* | 9/2011 | Matsubara et al. | 310/309 |
| 8,710,712 B2* | 4/2014 | Nakatsuka et al. | 310/309 |
| 2007/0221958 A1 | 9/2007 | Aoki | |
| 2008/0122313 A1* | 5/2008 | Mabuchi et al. | 310/309 |

FOREIGN PATENT DOCUMENTS

| | | |
|---|---|---|
| CN | 101043068 A | 9/2007 |
| JP | 2008-161036 A | 7/2008 |
| JP | 2008-161040 A | 7/2008 |

(Continued)

OTHER PUBLICATIONS

Office Action issued in corresponding Chinese Application No. 201080031483.1, mailed Nov. 22, 2013 (11 pages).

(Continued)

*Primary Examiner* — Hanh Nguyen
(74) *Attorney, Agent, or Firm* — Osha Liang LLP

(57) ABSTRACT

An electrostatic induction generator has a first substrate and a second substrate that can move relative to each other while remaining opposed to each other, an electret provided in the first substrate, and a first electrode and a second electrode provided on a surface side opposed to the electret in the second substrate. A positional relationship between the electret and the first electrode and a positional relationship between the electret and the second electrode change in association with a change of relative positions between the first substrate and the second substrate, whereby an electrostatic capacitance between the electret and the first electrode and an electrostatic capacitance between the electret and the second electrode change to output an electric power. A structure that decreases the electrostatic capacitance between the first electrode and the second electrode is provided between the first electrode and the second electrode.

14 Claims, 10 Drawing Sheets

(56) References Cited

FOREIGN PATENT DOCUMENTS

| JP | 2008-252847 A | 10/2008 |
|---|---|---|
| JP | 2009-44949 A | 2/2009 |
| JP | 2009-55736 A | 3/2009 |
| JP | 2009-077614 A | 4/2009 |
| JP | 2009-81950 A | 4/2009 |

OTHER PUBLICATIONS

Examination Report Issued in Japanese Application No. 2009191993, Dated: Jul. 2, 2013 (10 Pages).

International Search Report w/translation from PCT/JP2010/062829 dated Oct. 26, 2010 (3 pages).

Written Opinion from PCT/JP2010/062829 dated Oct. 26, 2010 (3 pages).

T. Tsutsumino, et al.; "Seismic Power Generator Using High-Performance Polymer Electret"; Proc. Int. Conf. MEMS'06; Jun. 2006; pp. 98-101 (4 pages).

Patent Abstracts of Japan Publication No. 2008-161036 dated Jul. 10, 2008 (1 page).

Patent Abstracts of Japan Publication No. 2008-252847 dated Oct. 16, 2008 (1 page).

* cited by examiner

ELECTROSTATIC INDUCTION POWER GENERATOR

BACKGROUND

1. Technical Field

The present invention relates to an electrostatic induction generator.

2. Background Art

Conventionally there is well known an electrostatic induction generator, in which a pair of substrates that can move relatively while remaining opposed to each other is provided, plural electrets are arrayed in one of the substrates, and plural sets of pairs of electrodes are arrayed on the other substrate. In the electrostatic induction generator, an electrostatic capacitance between one of the pair of electrodes and the electret and an electrostatic capacitance between the other electrode and the electret change by the relative movement of the pair of substrates respectively, whereby the change amount is output as an electric power.

Assuming that the pair of electrodes is made of the same material and has the same configuration and that the pair of substrates moves relatively (moves reciprocally) so as to oscillate at a constant frequency f, Boland, et al. say that a maximum output power Pmax is expressed by $Pmax = \sigma 2nA2\pi f \div [(\epsilon e \epsilon 0/d) \times ((\epsilon e g/d)+1)]$. Hereinafter, the above mathematical formula is referred to as an equation 1.

At this point, $\sigma$ is surface charge density in the pair of electrodes, n is (amplitude of the pair of substrates÷a pitch between the electrets), A is a maximum area in which the electret and the electrode overlap each other, $\epsilon e$ is specific permittivity of the electret, d is a thickness of the electret, $\epsilon 0$ is vacuum permittivity, and g is a gap between the pair of substrates.

According to the equation 1, it is necessary to increase n in order to enhance the output power. That is, it is necessary to increase the amplitude of the pair of substrates or to decrease the pitch between the electrets. However, when miniaturization of the electrostatic induction generator is demanded, there is a limitation to the increase in amplitude of the pair of substrates. In such cases, the output power can be increased on the equation 1 by decreasing the pitch between the electrets.

However, actually it is demonstrated that the output power cannot be increased as calculated even if the pitch between the electrets is decreased. According to a report, this is attributed to the fact that a parasitic capacitance generated in one of regions of the electrostatic induction generator degrades power generation efficiency (see Non-Patent Document 1). However, it has been unclear which region, in which the parasitic capacitance is generated, degrades the power generation efficiency.

Related technologies are disclosed in Patent Documents 1 to 3.

Patent Document 1: Japanese Unexamined Patent Publication No. 2008-161036

Patent Document 2: Japanese Unexamined Patent Publication No. 2009-77614

Patent Document 3: Japanese Unexamined Patent Publication No. 2008-252847

Non-Patent Document

Non-Patent Document 1: T. Tsutsumino, Y. Suzuki, N. Kasagi, K. Kashiwagi, and Y. Morizawa, "Micro Seismic Electret Generator for Energy Harvesting", The Sixth International Workshop and Nanotechnology for Power Generation and Energy Conversion Applications; Power MEMS 2006, Nov. 29-Dec. 1, 2006, Berkeley, U. S. A.

SUMMARY

One or more embodiments of the present invention provides an electrostatic induction generator that achieves the improvement of the power generation efficiency.

As a result of discussions and trials, the inventors were able to find the generation region of the parasitic capacitance that causes the degradation of the power generation efficiency. From the viewpoint of a technical common sense, it has been considered that the parasitic capacitance generated in a certain region of the pair of electrodes causes the degradation of the power generation efficiency. On the other hand, it has been considered that the parasitic capacitance generated between the electrodes, which are provided on the same substrate, is ignorable because each of the electrodes is constructed by a thin film. However, the inventors found that the parasitic capacitance generated between the electrodes causes the degradation of the power generation efficiency.

Therefore, according to one or more embodiments of the present invention, a structure decreases the electrostatic capacitance between the electrodes.

More specifically, one ore more embodiments of the present invention provides an electrostatic induction generator including: a first substrate and a second substrate, which can move relatively while remaining opposed to each other; an electret that is provided in the first substrate; and a first electrode and a second electrode, which are provided on a surface side opposed to the electret in the second substrate, wherein a positional relationship between the electret and the first electrode and a positional relationship between the electret and the second electrode change in association with a change of relative positions between the first substrate and the second substrate, whereby an electrostatic capacitance between the electret and the first electrode and an electrostatic capacitance between the electret and the second electrode change to output an electric power, and a structure that decreases the electrostatic capacitance between the first electrode and the second electrode (a specific structure that decreases the electrostatic capacitance between the first electrode and the second electrode, not only providing the first electrode and the second electrode on the substrate) is provided between the first electrode and the second electrode.

According to one or more embodiments of the present invention, the structure that decreases the electrostatic capacitance between the first electrode and the second electrode is provided between the electrodes, so that the parasitic capacitance generated between the electrodes can be decreased. Accordingly, the power generation efficiency can be improved.

In order to decrease the electrostatic capacitance between the electrodes, it is conceivable that the distance between the electrodes is lengthened, or it is conceivable that the permittivity between the electrodes is decreased. However, when miniaturization of the electrostatic induction generator is achieved, there is a limitation to the increase in length between the electrodes.

Therefore, the structure that decreases the electrostatic capacitance may be a structure that is provided between the first electrode and the second electrode to decrease the permittivity between the first electrode and the second electrode.

The following configurations may be adopted as the structure that decreases the permittivity between the electrodes.

In other words, the configuration in which permittivity between the first electrode and the second electrode is decreased by making a through-hole in a portion between the first electrode and the second electrode in the second substrate may be adopted.

The configuration in which the permittivity between the first electrode and the second electrode is decreased by providing a recess in a portion between the first electrode and the second electrode in the second substrate may be adopted.

The configuration in which the permittivity between the first electrode and the second electrode is decreased by providing a layer made of a material having specific permittivity lower than that of the second substrate in a portion between the second substrate and the first electrode, and between the second substrate and the second electrode may be adopted. The two configurations described above may be combined with this configuration.

According to one or more embodiments of the present invention, on a second substrate side, a surface side opposed to the first substrate is covered with an insulating film. Therefore, a discharge from the electret can be prevented.

As described above, according to one or more embodiments of the present invention, the power generation efficiency can be improved.

DETAILED DESCRIPTION

Hereinafter, embodiments of the invention will be described with reference to the drawings. However, the present invention is not limited to sizes, materials, shapes, relative dispositions and the like of the components described in the following embodiments and examples. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.
(Embodiment)
<Entire Configuration of Electrostatic Induction Generator>

Figure 1:
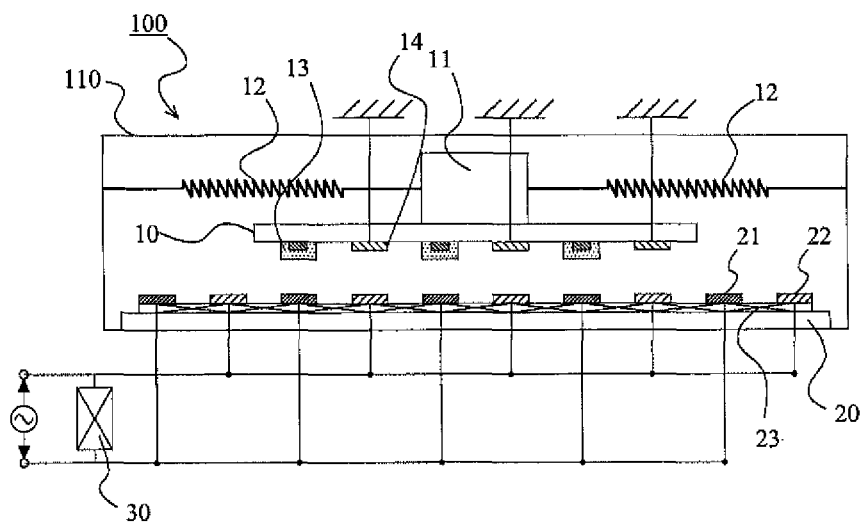
FIG. 1 is a schematic configuration diagram of an electrostatic induction generator according to one or more embodiments of the present invention.
Figure 1:
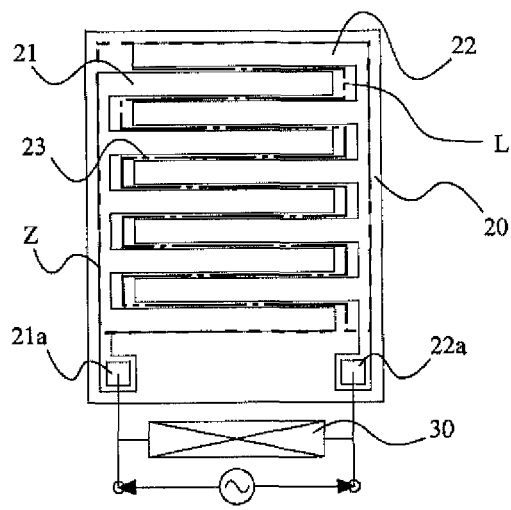

An entire configuration of an electrostatic induction generator according to one or more embodiments of the present invention will be described with reference to FIG. 1. FIG. 1(a) is a schematic sectional view illustrating a whole of the electrostatic induction generator of one or more embodiments of the present invention. FIG. 1(b) is a schematic configuration diagram illustrating a configuration of a second substrate described below. In FIG. 1(b), the second substrate is viewed in plan configuration. An electrostatic induction generator 100 of one or more embodiments of the present invention includes a chassis 110, a first substrate 10, and a second substrate 20, and the first substrate 10 and the second substrate 20 are provided in the chassis 110.

The first substrate 10 is retained by a retention member 11. The retention member 11 is supported by a pair of springs 12, in which one end thereof is fixed onto an inner wall surface side of the chassis 110 while the other end is fixed to the retention member 11. Therefore, the retention member 11 can move (oscillate) in a horizontal direction of FIG. 1(a), and the first substrate 10 also moves (oscillates) in conjunction with the retention member 11.

The first substrate 10 and the second substrate 20 are disposed opposite to each other. The first substrate 10 and the second substrate 20 are configured to move while remaining opposed to each other. That is, the first substrate 10 and the second substrate 20 are configured to be able to move relatively while remaining opposed to each other. In one or more embodiments of the present invention, the first substrate 10 is configured to be able to move. Alternatively, the second substrate 20 may be configured to be able to move, or both the first substrate 10 and the second substrate 20 may be configured to be able to move.

In the first substrate 10, plural electrets 13 each of which is formed on a conductor and plural grounded guard electrodes 14 are alternately arrayed on a surface side opposed to the second substrate 20. In one or more embodiments of the present invention, the electret 13 is configured to semipermanently retain a negative charge.

In the second substrate 20, plural pairs of electrodes (first electrodes 21 and second electrodes 22) are arrayed on a surface side opposed to the first substrate 10. The first electrodes 21 included in the pairs are electrically connected to one another, and the second electrodes 22 are also electrically connected to one another. In one or more embodiments of the present invention, the first electrodes 21 and the second electrodes 22 are electrically connected by use of a comb-shaped electrode, respectively (see FIG. 1(b)). A load 30 to which an electric power obtained by power generation is electrically connected through a first electrode pad 21a electrically connected to the first electrodes 21 and a second electrode pad 21b electrically connected to the second electrodes 22.

In the electrostatic induction generator 100 of one or more embodiments of the present invention, a structure (hereinafter referred to as an electrostatic capacitance decreasing structure 23) that decreases an electrostatic capacitance between the first electrode 21 and the second electrode 22 is provided between the first electrode 21 and the second electrode 22.
<Power Generation Principle of Electrostatic Induction Generator>

Figure 2:
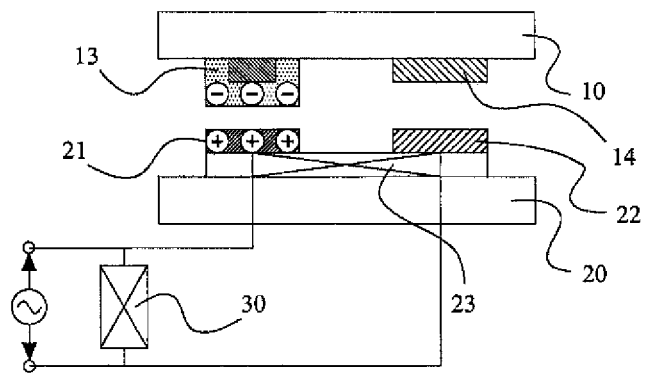
FIG. 2 is a view illustrating a power generation principle of the electrostatic induction generator according to one or more embodiments of the present invention.
Figure 2:
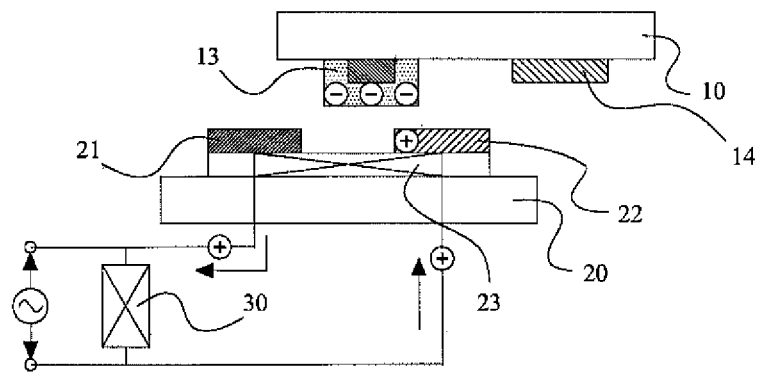
Figure 2:
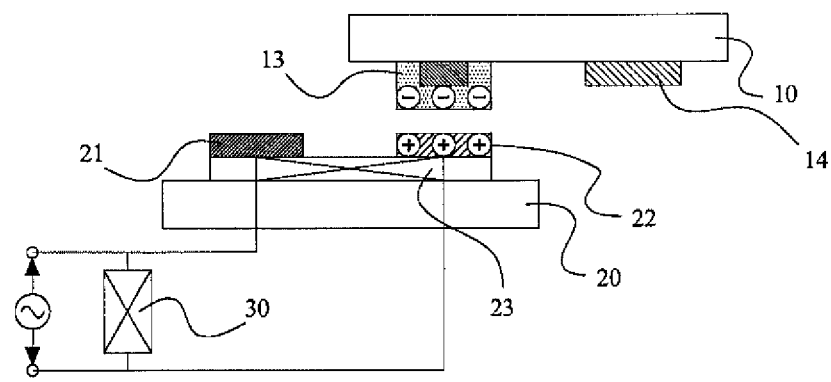

A power generation principle of the electrostatic induction generator of one or more embodiments of the present invention will be described with reference to FIGS. 2 and 3.

A relative positional relationship between the first substrate 10 and the second substrate 20 changes by the movement of the first substrate 10. Therefore, a positional relationship between the electret 13 and the first electrode 21 and a positional relationship between the electret 13 and the second electrode 22 also change. FIG. 2(a) illustrates a state in which the whole surface of the electret 13 is opposed to the whole surface of the first electrode 21 while the electret 13 is not opposed to the second electrode 22 at all. FIG. 2(b) illustrates a state in which the electret 13 is not opposed to the first electrode 21 at all while the electret 13 is partially opposed to the second electrode 22. FIG. 2(c) illustrates a state in which the whole surface of the electret 13 is opposed to the whole surface of the second electrode 22 while the electret 13 is not opposed to the first electrode 21 at all.

The electrostatic capacitance between the electret 13 and the first electrode 21 is maximized in the state of FIG. 2(a). At this point, there is also an electrostatic capacitance between the electret 13 and the second electrode 22. The electrostatic capacitance between the electret 13 and the second electrode 22 is maximized in the state of FIG. 2(c). At this point, there is also an electrostatic capacitance between the electret 13 and the first electrode 21. The electrostatic capacitance between the electret 13 and the first electrode 21 and the electrostatic capacitance between the electret 13 and the second electrode 22 change respectively by the movement of the first substrate 10.

FIG. 2(b) illustrates the state in the middle of a transition from the state of FIG. 2(a) to the state of FIG. 2(c). During a procedure of the transition, electrostatic capacitance between the electret 13 and the first electrode 21 is decreased, and the electrostatic capacitance between the electret 13 and the second electrode 22 is increased. Because the first electrode 21 and the second electrode 22 are electrically connected through the load 30, a positive charge moves from the first electrode 21 toward the second electrode 22. Therefore, the electric power is generated.

Figure 3:
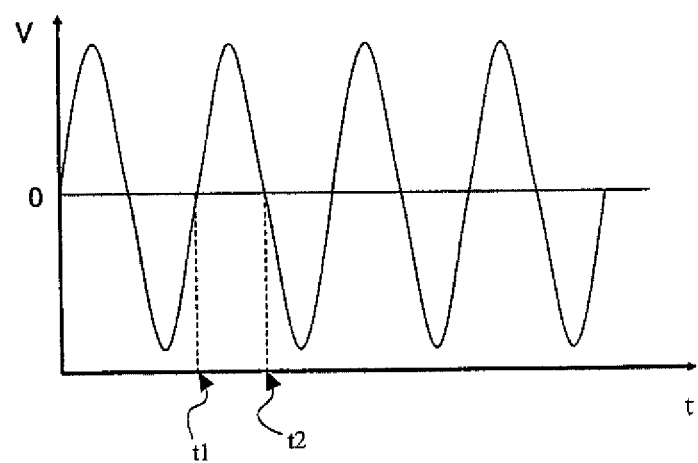
FIG. 3 is a view illustrating an output voltage of the electrostatic induction generator according to one or more embodiments of the present invention.

FIG. 3 is a graph illustrating a variation in output voltage V to an elapsed time t when the state of FIG. 2(a) and the state of FIG. 2(c) vary alternately with a constant period (the first substrate 10 oscillates (moves reciprocally) with a constant period). In FIG. 3, t1 corresponds to the time in the state of FIG. 2(a), and t2 corresponds to the time in the state of FIG. 2(c).

At this point, in order to stably obtain the output voltage, desirably the output voltage draws a curve in which a center of a high voltage and a low voltage becomes 0 (V) as illustrated in FIG. 3. In one or more embodiments of the present invention, in the output voltage, the center of the high voltage and the low voltage can be set to 0 (V) by providing the guard electrode 14. For example, as illustrated in FIG. 2(a), a potential at the second electrode 22 becomes 0 (V) by a Kirchhoff law in the state in which the electret 13 is opposed to the first electrode 21 while the grounded guard electrode 14 is opposed to the second electrode 22. In the state of FIG. 2(c), the first electrode 21 is opposed to the guard electrode 14 (not illustrated in FIG. 2(c)) and the potential at the first electrode 21 becomes 0 (V). Accordingly, the curve of the output voltage can be obtained as illustrated in FIG. 3, and the output voltage can stably be obtained.

<Parasitic Capacitance>

A parasitic capacitance will be described with reference to FIGS. 4 and 5. As described above in the background art, according to the equation 1, the output power is expected to be enhanced when a pitch between the electrets is decreased while n is increased. However, actually the output voltage cannot be enhanced according to the equation 1. This is attributed to the fact that the parasitic capacitance is generated in one of regions of the generator. However, it has been unclear which region, in which the parasitic capacitance is generated, degrades power generation efficiency. As a result of discussions and trials, the inventors found that the parasitic capacitance generated between the first electrode 21 and the second electrode 22 degrades the power generation efficiency.

In other words, from the viewpoint of a technical common sense, in the electrostatic induction generator, it has been considered that the parasitic capacitance generated between the first electrode 21 and the second electrode 22, which are provided on the second substrate 20, is ignorable because each of the first electrode 21 and the second electrode 22 is constructed by a thin film (for example, 1 μm or less). However, actually it is found that the parasitic capacitance generated between the first electrode 21 and the second electrode 22 degrades the power generation efficiency.

Figure 4:
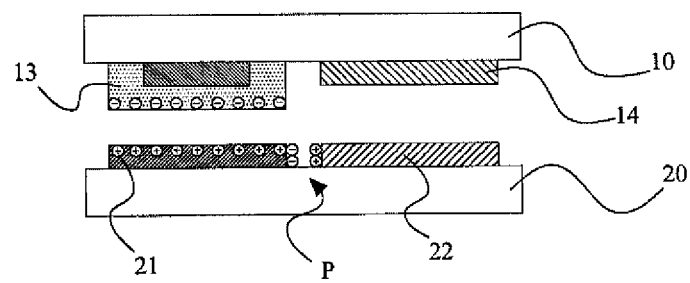
FIG. 4 is a view illustrating generation of a parasitic capacitance in the electrostatic induction generator.

FIG. 4 illustrates a state in which the electret 13 is opposed to the first electrode 21 while the guard electrode 14 is opposed to the second electrode 22 in a conventional structure that does not include the electrostatic capacitance decreasing structure 23. A charge distribution, in which the negative charges gather on a side surface on the side of the second electrode 22 in the first electrode 21 while the positive charges gather on a side surface on the side of the first electrode 21 in the second electrode 22, is assumed as illustrated by an arrow P in FIG. 4.

Figure 5:
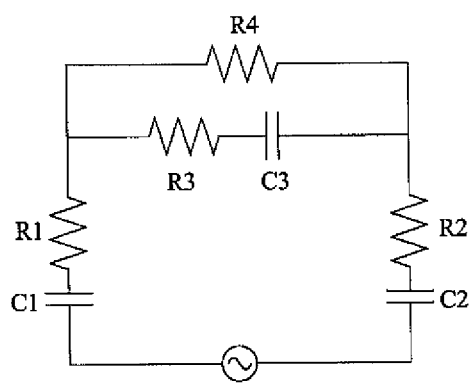
FIG. 5 is an equivalent circuit diagram when the parasitic capacitance is generated in the electrostatic induction generator.

FIG. 5 is an equivalent circuit diagram of the electrostatic induction generator in the state of FIG. 4. In FIG. 5, C1 and R1 correspond to an electrostatic capacitance and an electric resistance between the electret 13 and the first electrode 21, respectively, C2 and R2 correspond to an electrostatic capacitance and an electric resistance between the electret 13 and the second electrode 22, respectively, C3 and R3 correspond to an electrostatic capacitance and an electric resistance between the first electrode 21 and the second electrode 22, respectively, and R4 corresponds to an electric resistance of the load 30. The output power is consumed by the electric resistance R4 of the load 30.

As can be seen from the equivalent circuit diagram, the electric power consumed by the electric resistance R4 is decreased with increasing electrostatic capacitance C3. That is, the power generation efficiency is degraded.

For example, in the electrostatic induction generator, the electrostatic capacitance of each portion was measured in the state of FIG. 4. The electrostatic induction generator has an electrode size (as illustrated in FIG. 1(b), vertical and horizontal lengths of a portion corresponding to a domain Z where the plural electrodes are disposed) of 20×20 mm, a line width of the electrode (in FIG. 4, a distance between the first electrode 21 and the second electrode 22 in a horizontal direction) of 300 μm, the gap between the first electrode 21 and the second electrode 22 of 20 μm, the film thicknesses of the first electrode 21 and the second electrode 22 of 0.4 μm, the gap between the first substrate 10 and the second substrate 20 of 100 μm, and the specific permittivity of the second substrate 20 of 4.7.

As a result of the measurement, the electrostatic capacitance (corresponding to C1) between the electret 13 and the first electrode 21 was 20 pF, the electrostatic capacitance (corresponding to C2) between the electret 13 and the second electrode 22 was 15.8 pF, and the electrostatic capacitance (corresponding to C3) between the first electrode 21 and the second electrode 22 was 75 pF.

Accordingly, ΔC=20 pF−15.8 pF=4.2 pF and ΔC/20 pF=0.21 were obtained, and it was found that only 21% of the power generation amount calculated from the equation 1 was taken out as the electric power.

In one or more embodiments of the present invention, as described above, the electrostatic capacitance decreasing structure 23 is provided between the first electrode 21 and the second electrode 22. Therefore, the electrostatic capacitance C3 that becomes the parasitic capacitance causing the degradation of the power generation efficiency can be decreased to improve the power generation efficiency.

At this point, the electrostatic capacitance C3 is expressed by $C3 \cong \pi \epsilon L \div \log(D/a)$. Where $\epsilon$ is permittivity between the first electrode 21 and the second electrode 22, D is a gap between the first electrode 21 and the second electrode 22, a is a half (½) of a thickness of the first electrode 21 and the second electrode 22, and L is a total length of a domain where the first electrode 21 is opposed to the second electrode 22 (in the case of the configuration of FIG. 1(b), L corresponds to the total length of a portion indicated by an alternate long and short dash line).

As can be seen from the above equation, in order to decrease the electrostatic capacitance C3 that becomes the parasitic capacitance, it is necessary to decrease the permittivity $\epsilon$ between the first electrode 21 and the second electrode 22, or it is necessary to widen the gap between the first electrode 21 and the second electrode 22. Assuming that the amplitude of the pair of substrates is kept constant in the equation 1, because n is decreased, the latter means little. When the miniaturization of the electrostatic induction generator is demanded, there is a limitation to the increase of the gap between the first electrode 21 and the second electrode 22. Accordingly, the structure that decreases the permittivity $\epsilon$ between the first electrode 21 and the second electrode 22 is desirably adopted as the electrostatic capacitance decreasing structure 23.

The permittivity $\epsilon$ between the first electrode 21 and the second electrode 22 is decreased with decreasing specific permittivity of a body that exists in a domain connecting the first electrode 21 and the second electrode 22. In the case that a space made of air or vacuum exists in the domain connecting the first electrode 21 and the second electrode 22, the permittivity $\epsilon$ is decreased with increasing space. Some specific examples that implement the structure of one or more embodiments of the present invention will be described below.

FIRST EXAMPLE

Figure 6:
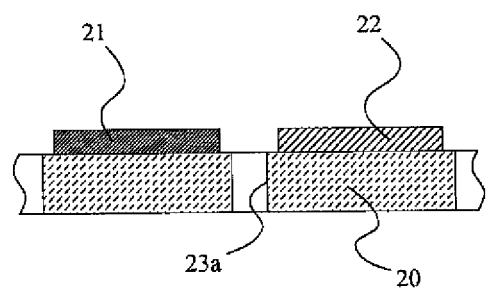
FIG. 6 is a schematic sectional view illustrating an electrostatic capacitance decreasing structure according to a first example of the present invention.

An electrostatic capacitance decreasing structure according to a first example of the present invention will be described with reference to FIG. 6. In the first example, a through-hole 23a is made in a portion between the first electrode 21 and the second electrode 22 of the second substrate 20. Therefore, a large space (a domain made of air or vacuum) is formed between the first electrode 21 and the second electrode 22. Accordingly, the permittivity between the electrodes can be decreased. For example, in the case that a glass substrate having the specific permittivity of 4 to 4.7 is used as the material for the second substrate 20, the electrostatic capacitance between the first electrode 21 and the second electrode 22 can be decreased to about ¼ by making the through-hole 23a.

A method for producing the electrostatic capacitance decreasing structure in the second substrate 20 having the above configuration will briefly be described. Firstly, a metallic electrode (corresponding to the first electrode 21 and the second electrode 22) is formed on the second substrate 20. In the case of a silicon substrate, after a film such as an oxide film which has a high insulating property is formed on a surface of the silicon substrate, the metallic electrode is formed on the film. In the case of the glass substrate, the metallic electrode is directly formed on the glass surface. A material such as aluminum, gold, and copper which has high conductivity is used as the material for the metallic electrode, a metallic film is formed on the substrate by evaporation, sputtering, and the like, and a pattern is formed by photolithography. Then the through-hole 23a is made. In the case of the silicon substrate, the through-hole 23a can be made by wet etching with KOH or TMAH, dry etching, and the like. In the case of the glass substrate, the through-hole 23a can be made by dry etching, blasting, laser machining, wet etching with HF, and the like.

SECOND EXAMPLE

Figure 7:
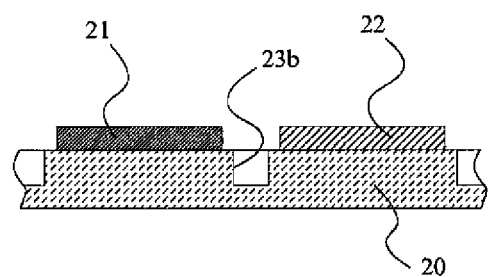
FIG. 7 is a schematic sectional view illustrating an electrostatic capacitance decreasing structure according to a second example of the present invention.
Figure 7:
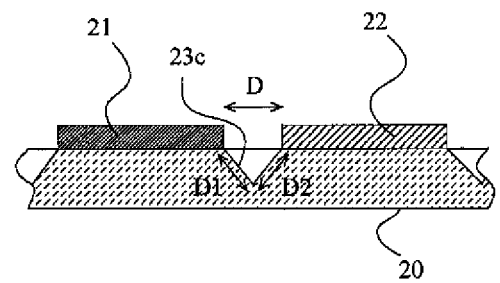

An electrostatic capacitance decreasing structure according to a second example of the present invention will be described with reference to FIG. 7. In the second example, a recess is formed in the portion between the first electrode 21 and the second electrode 22 of the second substrate 20. FIG. 7(a) illustrates the case that a recess 23b is constructed by a groove having a rectangular shape in section, and FIG. 7(b) illustrates the case that a recess 23c is constructed by a groove having a triangular shape in section. Although not illustrated, the sectional shape of the recess is not limited to the shapes of FIGS. 7(a) and 7(b). For example, a surface constituting the recess is not limited to the flat surface, but the surface may have a curved portion.

In the second example, similarly to the first example, the space (the domain made of air or vacuum) is formed between the first electrode 21 and the second electrode 22. In the case of the first example, the large space is formed between the first electrode 21 and the second electrode 22. On the other hand, in the second example, because the substrate exists in a position distant from the electrode, the small space is formed between the first electrode 21 and the second electrode 22 compared with the case of the first example. However, compared with the case that the recess is not provided, the large space can be formed between the first electrode 21 and the second electrode 22. Accordingly, the permittivity between the electrodes can be decreased. The method for producing the electrostatic capacitance decreasing structure in the second substrate 20 is similar to that of the first example.

According to the second example, the recess is formed to an extent that the recess does not reach the through-hole, so that the electrostatic capacitance decreasing structure can be produced at lower cost compared with the case of the first example. In the case that the glass substrate having the specific permittivity of 4 to 4.7 is used as the material for the second substrate 20, the electrostatic capacitance between the first electrode 21 and the second electrode 22 can be decreased to about ½ by providing the recesses 23b or 23c. The reason the permittivity can be decreased by providing the recess will be described in detail by taking the configuration of FIG. 7(b) as an example. As illustrated in FIG. 7(b), it is assumed that D is the distance between the first electrode 21 and the second electrode 22, and it is assumed that D1 and D2 are widths of two tilt surfaces in the recess 23c, respectively. In the case that the recess 23c is eliminated, an electrostatic capacitance C approximately becomes $C \cong \pi \epsilon L \div \log(D/a)$. Where $\epsilon$ is the permittivity between the first electrode 21 and the second electrode 22, L is the total length of the domain where the first electrode 21 is opposed to the second electrode 22, and a is a half (½) of the thickness of the first electrode 21 and the second electrode 22. On the other hand, it is assumed that C' is an electrostatic capacitance when the recess 23c is provided, and it is assumed that D1 and D2 are distances on the left and right of an apex in the substantially triangular recess 23c, respectively. The electrostatic capacitance C' approximately becomes C'≅π ϵ L÷log((D1+D2)/a)=π ϵ'÷log (D/a). Therefore, it is found that the permittivity between the first electrode 21 and the second electrode 22 can be decreased. As described above, even if the positional relationship (distance) between the first electrode 21 and the second electrode 22 is not changed, the distance passing through the surface of the substrate is lengthened by providing the recess, which allows the permittivity between the electrodes can be decreased.

THIRD EXAMPLE

Figure 8:
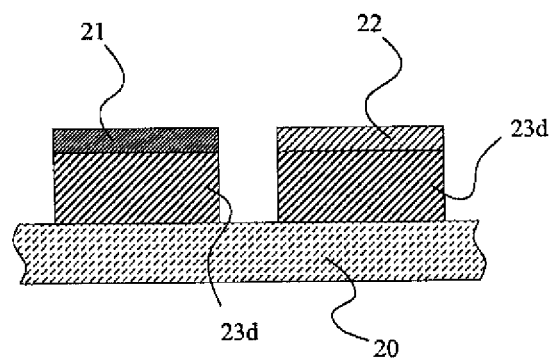
FIG. 8 is a schematic sectional view illustrating an electrostatic capacitance decreasing structure according to a third example of the present invention.

An electrostatic capacitance decreasing structure according to a third example of the present invention will be described with reference to FIG. 8. In the third example, layers 23d made of a material having, the specific permittivity lower than that of the second substrate 20 are provided between the second substrate 20 and the first electrode 21 and between the second substrate 20 and the second electrode 22, respectively.

In the configuration of the third example, similarly to the second example, the recess (the groove having the rectangular shape in section) is formed between the first electrode 21 and the second electrode 22 in the second substrate 20. Accordingly, the large space can be formed between the first electrode 21 and the second electrode 22. Further, the layers 23d made of the material having the specific permittivity lower than that of the second substrate 20 are interposed between the second substrate 20 and the first electrode 21 and between the second substrate 20 and the second electrode 22, respectively. Accordingly, the permittivity between the first electrode 21 and the second electrode 22 can be decreased.

A method for producing the electrostatic capacitance decreasing structure in the second substrate 20 having the above configuration will briefly be described. Firstly, a layer (film) made of a material (such as a fluorine resin, parylene, and an interlayer insulating material) having the low specific permittivity is formed on the second substrate 20 by CDV or application (such as spin coating and dipping). The metallic electrode is formed on the layer. Then the recess is formed by dry etching (such as O2 ashing), blasting, thermal transfer with a metallic mold, and the like. In the third example of FIG. 8, the groove having the rectangular shape in section is illustrated as the recess. Alternatively, the groove having the triangular shape in section may be used as the recess. Although not illustrated, the sectional shape of the recess is not limited to the shapes of FIG. 8. For example, the surface constituting the recess is not limited to the flat surface, but the surface may have the curved portion.

According to the third example, it is not necessary to make the through-hole in the substrate, so that the electrostatic capacitance decreasing structure in the second substrate 20 can be produced at lower cost compared with the case of the first example. In the case that the glass substrate having the specific permittivity of 4 to 4.7 is used as the material for the second substrate 20, the electrostatic capacitance between the first electrode 21 and the second electrode 22 can be decreased to about ½ by interposing the layer 23d.

For example, in the electrostatic induction generator, the electrostatic capacitance of each portion was measured similarly to the case of FIG. 4. The electrostatic induction generator has the electrode size (as illustrated in FIG. 1(b), vertical and horizontal lengths of a portion corresponding to a domain Z where the plural electrodes are disposed) of 20×20 mm, the line width of the electrode (in FIG. 8, the distance between the first electrode 21 and the second electrode 22 in the horizontal direction) of 300 μm, the gap between the first electrode 21 and the second electrode 22 of 20 μm, the film thicknesses of the first electrode 21 and the second electrode 22 of 0.4 μm, the gap between the first substrate 10 and the second substrate 20 of 100 μm, a thickness of the layer 23d made of the fluorine resin of 15 μm, and the specific permittivity of the second substrate 20 of 4.7.

As a result of the measurement, the electrostatic capacitance (corresponding to C1) between the electret 13 and the first electrode 21 was 20 pF, the electrostatic capacitance (corresponding to C2) between the electret 13 and the second electrode 22 was 13.4 pF, and the electrostatic capacitance (corresponding to C3) between the first electrode 21 and the second electrode 22 was 41 pF.

Accordingly, ΔC=20 pF−13.4 pF=6.6 pF and ΔC/20 pF=0.33 were obtained, and it was found that 33% of the power generation amount calculated from the equation 1 was taken out as the electric power.

FOURTH EXAMPLE

Figure 9:
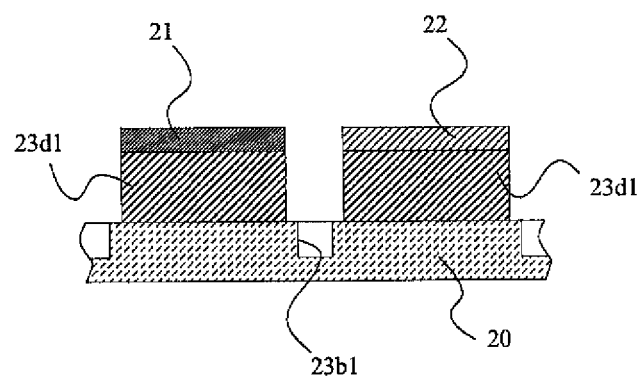
FIG. 9 is a schematic sectional view illustrating an electrostatic capacitance decreasing structure according to a fourth example of the present invention.

An electrostatic capacitance decreasing structure according to a fourth example of the present invention will be described with reference to FIG. 9. In the fourth example, layers 23d1 made of a material having the specific permittivity lower than that of the second substrate 20 are provided between the second substrate 20 and the first electrode 21 and between the second substrate 20 and the second electrode 22, respectively, and a recess 23b1 is provided in the second substrate 20. That is, the characteristic configuration of the second example and the characteristic configuration of the third example are combined in the fourth example. According to the fourth example, the electrostatic capacitance between the first electrode 21 and the second electrode 22 can further be decreased compared with the second and third examples.

FIFTH EXAMPLE

Figure 10A:
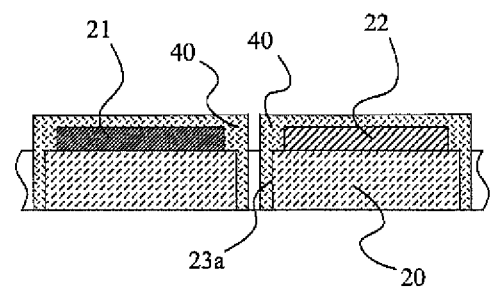
FIG. 10 is a schematic sectional view illustrating an electrostatic capacitance decreasing structure according to a fifth example of the present invention.
Figure 10B:
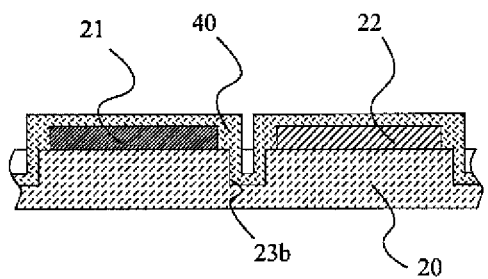

An electrostatic capacitance decreasing structure according to a fifth example of the present invention will be described with reference to FIG. 10. In the fifth example, on the side of the second substrate 20, a surface side opposed to the first substrate 10 is covered with an insulating film 40. FIG. 10(a) illustrates the case that the structure of the first example is adopted as the electrostatic capacitance decreasing structure of the fifth example, and FIG. 10(b) illustrates the case that the structure of the second example is adopted as the electrostatic capacitance decreasing structure of the fifth example. Although not illustrated, the structures of the third and fourth examples may also be adopted.

According to the fifth example, on the side of the second substrate 20, the surface side opposed to the first substrate 10 is covered with the insulating film 40, so that a discharge from the electret 13 can be prevented.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 10 first substrate
11 retention member 12 spring
13 electret
14 guard electrode
20 second substrate
21 first electrode
22 second electrode
23 electrostatic capacitance decreasing structure
23a through-hole
23b, 23b1, 23c recess
23d, 23d1 layer
30 load
40 insulating film
100 electrostatic induction generator
110 chassis

The invention claimed is:

1. An electrostatic induction generator comprising:
a first substrate and a second substrate that can move relative to each other while remaining opposed to each other;
an electret provided in the first substrate; and
a first electrode and a second electrode provided on a surface side opposed to the electret in the second substrate,
wherein a positional relationship between the electret and the first electrode and a positional relationship between the electret and the second electrode change in association with a change of relative positions between the first substrate and the second substrate, whereby an electrostatic capacitance between the electret and the first electrode and an electrostatic capacitance between the electret and the second electrode change to output an electric power, and
wherein a structure that decreases the electrostatic capacitance between the first electrode and the second electrode is provided between the first electrode and the second electrode.

2. The electrostatic induction generator according to claim 1, wherein the structure that decreases the electrostatic capacitance is a structure that is provided between the first electrode and the second electrode to decrease permittivity between the first electrode and the second electrode.

3. The electrostatic induction generator according to claim 2, wherein permittivity between the first electrode and the second electrode is decreased by making a through-hole in a portion between the first electrode and the second electrode in the second substrate.

4. The electrostatic induction generator according to claim 3, wherein permittivity between the first electrode and the second electrode is decreased by providing a layer made of a material having specific permittivity lower than that of the second substrate in a portion between the first electrode and the second electrode in the second substrate.

5. The electrostatic induction generator according to claim 4, wherein, on a second substrate side, a surface side opposed to the first substrate is covered with an insulating film.

6. The electrostatic induction generator according to claim 3, wherein, on a second substrate side, a surface side opposed to the first substrate is covered with an insulating film.

7. The electrostatic induction generator according to claim 2, wherein permittivity between the first electrode and the second electrode is decreased by providing a recess in a portion between the first electrode and the second electrode in the second substrate.

8. The electrostatic induction generator according to claim 7, wherein permittivity between the first electrode and the second electrode is decreased by providing a layer made of a material having specific permittivity lower than that of the second substrate in a portion between the first electrode and the second electrode in the second substrate.

9. The electrostatic induction generator according to claim 8, wherein, on a second substrate side, a surface side opposed to the first substrate is covered with an insulating film.

10. The electrostatic induction generator according to claim 7, wherein, on a second substrate side, a surface side opposed to the first substrate is covered with an insulating film.

11. The electrostatic induction generator according to claim 2, wherein permittivity between the first electrode and the second electrode is decreased by providing a layer made of a material having specific permittivity lower than that of the second substrate in a portion between the first electrode and the second electrode in the second substrate.

12. The electrostatic induction generator according to claim 11, wherein, on a second substrate side, a surface side opposed to the first substrate is covered with an insulating film.

13. The electrostatic induction generator according to claim 2, wherein, on a second substrate side, a surface side opposed to the first substrate is covered with an insulating film.

14. The electrostatic induction generator according to claim 1, wherein, on a second substrate side, a surface side opposed to the first substrate is covered with an insulating film.

* * * * *